United States Patent [19]
Cummings

[11] 4,235,409
[45] Nov. 25, 1980

[54] FISHING ROD HOLDER

[76] Inventor: Raymond V. Cummings, 8656 Marsh Rd., Algonac, Mich. 48001

[21] Appl. No.: 19,498

[22] Filed: Mar. 12, 1979

[51] Int. Cl.³ .................. A01K 97/10; A45B 25/28
[52] U.S. Cl. .................................. 248/538; 248/520
[58] Field of Search ............. 248/535, 518, 519, 520, 248/534, 538, 539; 85/1 H

[56] References Cited
U.S. PATENT DOCUMENTS

| | | | |
|---|---|---|---|
| 2,561,046 | 7/1951 | Brooks | 248/534 X |
| 2,676,680 | 4/1954 | Kindorf | 85/1 H UX |
| 2,734,555 | 2/1956 | Kroner | 248/520 |
| 3,077,613 | 2/1963 | Mayer | 248/289 X |
| 3,259,346 | 7/1966 | Rogers | 248/538 X |
| 3,259,346 | 7/1966 | Rogers | 248/534 X |
| 3,664,434 | 5/1972 | Connor | 85/1 H X |
| 3,802,652 | 4/1974 | Holton | 248/534 |
| 3,902,269 | 9/1975 | Dunlap | 248/534 X |
| 3,964,706 | 6/1976 | Adams | 248/534 X |

FOREIGN PATENT DOCUMENTS 1357221  6/1974  United Kingdom ................. 85/1 H

*Primary Examiner*—J. Franklin Foss
*Attorney, Agent, or Firm*—Burton, Parker & Schramm

[57] ABSTRACT

A fishing rod holder which may be easily clamped to a typical wooden dock having slots between the boards making up the dock. The holder has an anchoring means which is easily inserted through the slots and then turned to underlie the boards adjoining the slots. The anchor is then tightened to grasp the wooden boards securely between the base and the anchor. There is also provided as part of the holder a tubular socket sitting on a post attached to the base for receiving a fishing pole handle. To insure that the holder will not turn, holes are provided in which a peg may be inserted providing positive alignment of the holder in various directions.

1 Claim, 3 Drawing Figures

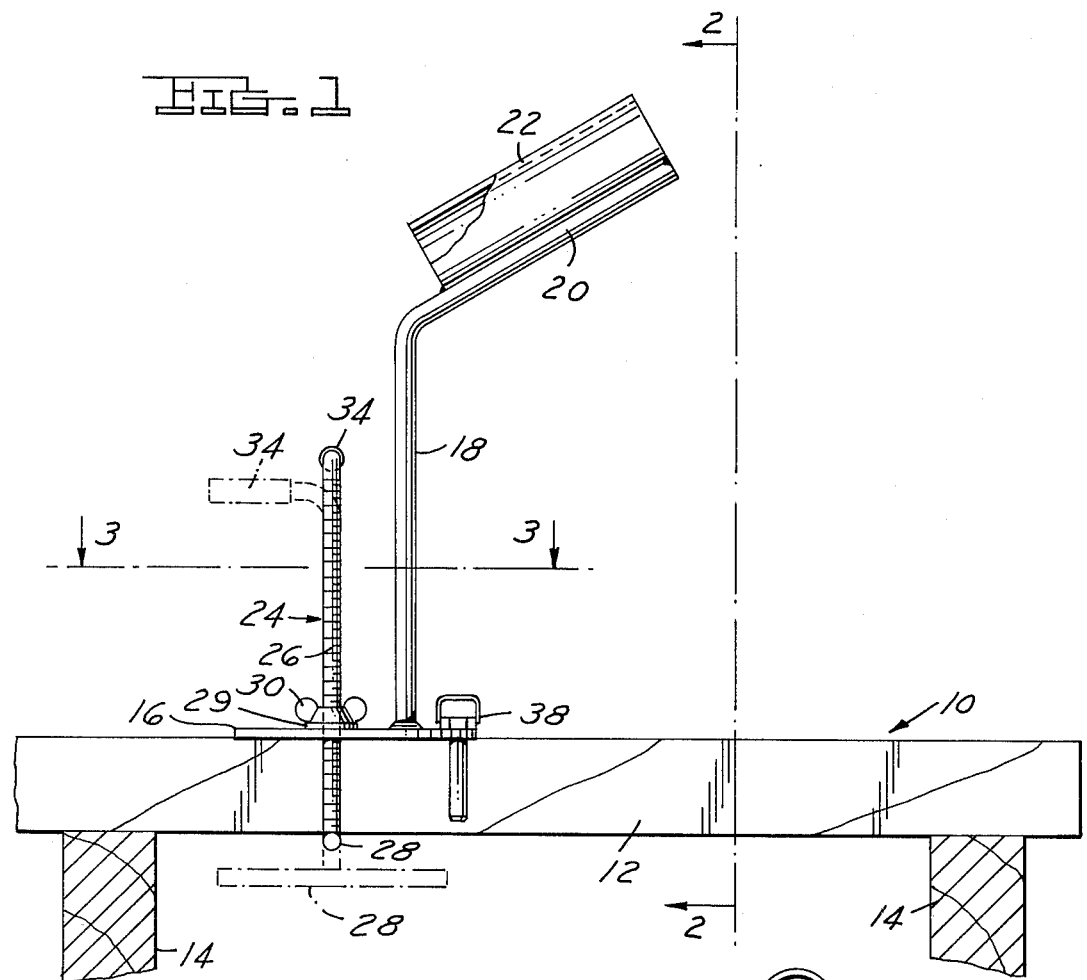
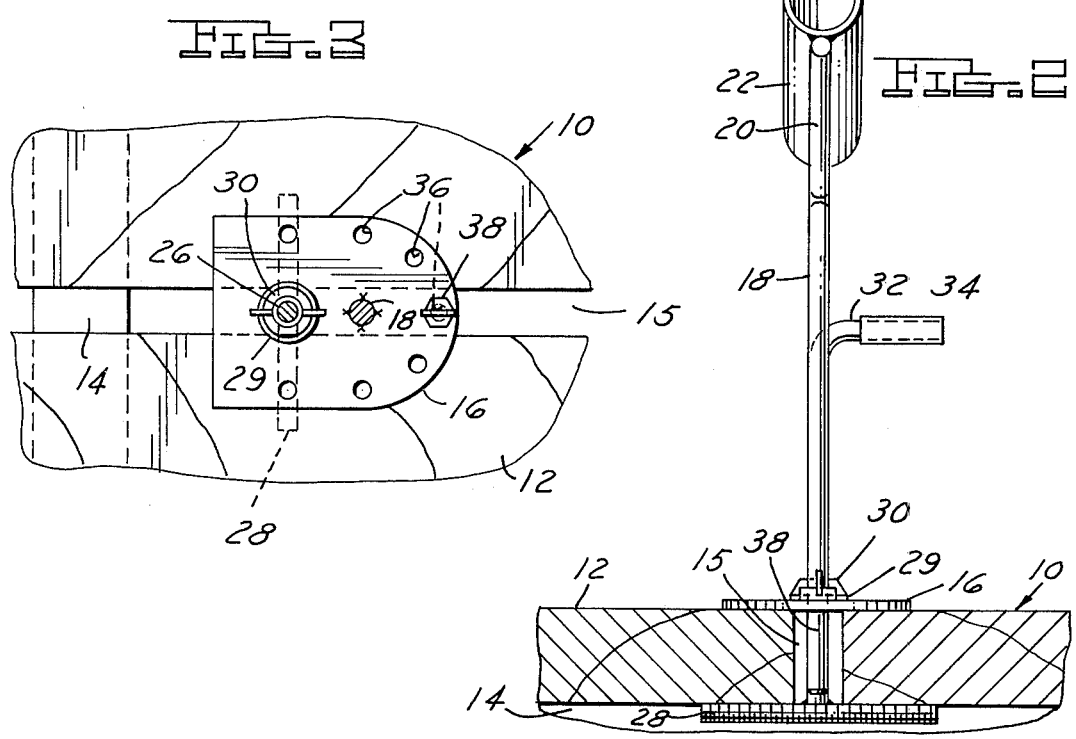

FISHING ROD HOLDER

BACKGROUND OF THE INVENTION

The present invention relates to fishing rod holders, particularly to holders which may be attached to docks.

When fishing, it is often desirable to have a method of resting the fishing pole when waiting for a strike. In answer to this need many fishing rod holders have been developed for attachment to boats, docks or to be placed in the ground. When the holders are attached to fishing docks, this has often been by means of a C-clamp design requiring placement at the very edge of the dock. There has been an unfulfilled desire for a holder which is easily attachable and detachable when not directly on the edge of the dock.

SUMMARY OF THE INVENTION

This invention is a fishing rod holder which has a base, means for holding a fishing rod handle which may take the form of a tubular socket on the post, an anchor and locking means for bringing the base and anchor together. The anchor includes a portion which when in one position will pass through a slot in the dock, but when turned to another position will not pass through the slot. A locking means will cause the anchor in its second position to grasp the dock between the anchor and the base.

BRIEF DESCRIPTION OF THE DRAWINGS

FIG. 1 is a side view of a fishing rod holder embodying the claimed invention with the anchor in its grasping position. The anchor is shown in dotted outline in the position which it takes during insertion.

FIG. 2 is a front view of the fishing rod holder taken along line 2—2 of FIG. 1

FIG. 3 is a section taken along line 3—3 of FIG. 1.

DESCRIPTION OF THE PREFERRED EMBODIMENTS

This invention is intended to be used on wooden fishing docks 10 and the like which are characterized by wooden boards 12 lying atop cross beams 14 where the boards are spaced apart leaving slots 15.

The invention itself has a base 16 to which is attached means for holding a fishing rod. In this embodiment, the holding means takes the form of a post 18 having its upper portion 20 bent to an upwardly deposed angle of 30°. On this upper portion is joined a tubular socket 22 which will allow the handle of the fishing pole to be placed therethrough.

Passing through the base 16 is an anchor 24. The anchor has two major portions. The first portion 26 is perpendicular to the base and rotates easily with respect to the base. The first portion also moves easily in the vertical direction. The second portion 28 of the anchor is joined to the first portion below the base. The second portion has one horizontal dimension smaller than the slot 15 between the boards making up the dock, but having its second horizontal dimension wider than the slot. In this embodiment the anchor is formed by having the first portion 26 a vertical rod or stem joined to the second portion 28 in the form of a horizontal rod or cross member to give an inverted T shape. Both portions of the anchor are screw threaded. A washer 29 and wing nut 30 are provided on the stem of the anchor above the base. Finally, the upper end of the first portion may be bent to provide a gripping portion 32. The gripping portion should be bent to point in the direction of the cross member. On the gripping portion may be provided a covering 34 to allow the anchor to be gripped more comfortably.

The base is also provided with a number of holes 36 around its periphery through which a peg 38 may be inserted.

To use the fishing rod holder, the base 16 is placed on the dock 10 with the part of the anchor below the base passing through the slot. At this point the cross member will be parallel to the slot (as shown in dotted lines in FIG. 1). This may require loosening the wing nut to allow a sufficient length of the stem to lie beneath the base. The base is then turned so that the tubular socket in which the fishing rod will be held is pointed in the desired direction. At this point, peg 38 is inserted in the hole 36 overlying slot 15. With the anchor and peg both in the slot, the base should no longer rotate, giving a positive alignment to the tubular socket.

Having selected the direction of the fishing rod holder, it becomes necessary to secure the holder to the dock. This is done by turning the anchor so that the cross member 28 may underlie portions of the boards adjoining the slot. This is done by turning the gripping portion 32 perpendicular to the direction of the slot which will in turn cause the cross member to lie perpendicular to the slot. By turning the wing nut 30, the cross member is drawn towards the base so that the dock is now grasped between the base and the anchor thereby securing the fishing rod holder. The threading on the second portion causes the anchor to take a very firm grip of the wooden boards. The fishing rod holder is now available for use.

To remove the fishing rod holder it is necessary to just reverse the procedure. Thus, the wing nut is loosened so the anchor no longer grasps the dock. The anchor is then turned until the cross member aligns with the slot and then the holder may be removed.

What is claimed is:

1. A fishing rod holder to be attached to a dock having a slot therethrough comprising;
    a base portion with a width greater than the width of said slot;
    an anchor having a first position for allowing an anchor portion below the base to be vertically movable through the slot, said anchor rotatable into a second position where said anchor portion is no longer so movable;
    said anchor portion comprising a screw threaded cross member of a length greater than the width of the slot joined to a screw threaded stem which passes upward through the base, the stem and cross member joined to resemble an inverted T;
    a fishing rod handle holding means comprising a post having an inclined upper portion and connected to the top side of the base and a tubular socket seated on and along said upper portion for insertion of a fishing rod handle therein;
    means for causing the base and said anchor portion when in the second position to grasp the dock therebetween comprising a wing nut on the threaded portion of the stem extending above the base which may be turned to decrease the distance between the base and the cross member thereby causing the dock to be grasped; and
    the base having a hole spaced from where the anchor passes through the base a distance greater than the width of the slot for insertion of a peg so that when the anchor is inserted through the slot and a peg is inserted through the hole into the slot the base will not rotate with respect to the slot.

* * * * *